United States Patent
Matsuura et al.

[11] Patent Number: 5,964,339
[45] Date of Patent: Oct. 12, 1999

[54] APPARATUS FOR DETECTING A TRANSVERSE MOVEMENT OF AN ENDLESS BELT

[75] Inventors: Masahiko Matsuura, Suita; Eiichi Sano, Takatsuki, both of Japan

[73] Assignee: Minolta Co., Ltd., Osaka, Japan

[21] Appl. No.: 08/762,582

[22] Filed: Dec. 10, 1996

[30] Foreign Application Priority Data

Dec. 12, 1995 [JP] Japan ................................. 7-323018
Aug. 28, 1996 [JP] Japan ................................. 8-226514

[51] Int. Cl.$^6$ ................................................. B65G 39/16
[52] U.S. Cl. ................................. 198/810.03; 198/807
[58] Field of Search .......................... 198/806, 807, 198/810.03

[56] References Cited

U.S. PATENT DOCUMENTS

| | | | |
|---|---|---|---|
| 3,193,086 | 7/1965 | Wilhelm | 198/807 |
| 3,956,632 | 5/1976 | Hall et al. | 198/810.03 X |
| 4,462,676 | 7/1984 | Shimura et al. | 198/806 X |
| 4,959,040 | 9/1990 | Gardner et al. | 198/807 X |
| 5,347,348 | 9/1994 | Nagata | 198/810.03 X |

FOREIGN PATENT DOCUMENTS

| | | | |
|---|---|---|---|
| 71407 | 4/1985 | Japan | 198/807 |
| 2-280180 | 11/1990 | Japan . | |
| 3-9387 | 1/1991 | Japan . | |
| 3-25473 | 2/1991 | Japan . | |
| 891535 | 12/1981 | U.S.S.R. | 198/807 |

*Primary Examiner*—James R. Bidwell
*Attorney, Agent, or Firm*—Burns, Doane, Swecker & Mathis, L.L.P.

[57] ABSTRACT

A detecting device includes a first electrode 42, a second electrode 44, and a conductive portion 14 mounted on a belt 12, for detecting a transverse movement of the belt 12. The electrodes 42 and 44 cooperate with the conductive portion 14 to form a contact-type switch, or mechanical switch. When the belt 12 moves from a first region 46 to a second region 48, the conductive portion 14 comes into contact with the electrodes 42 and 44 to close the switch. A control unit 50 detects an output from the switch. When the control unit 50 has detected a change of the output signal, it causes a correcting mechanism 24 to energize, thereby returning the belt to the first region.

13 Claims, 13 Drawing Sheets

APPARATUS FOR DETECTING A TRANSVERSE MOVEMENT OF AN ENDLESS BELT

FIELD OF THE INVENTION

The invention relates to an apparatus for detecting a transverse movement of an endless belt rotatably entrained around a plurality of rollers. Further, the invention relates to an apparatus for correcting the transverse movement of the belt. Furthermore, the invention is related to a fixing device for use in an image forming apparatus which includes the detecting device.

BACKGROUND OF THE INVENTION

As means for transporting products or transmitting a drive power from one place to another, there has been well known a belt mechanism which includes an endless belt rotatably supported by a plurality of rollers, at least one of which being drivingly connected with a motor for rotating the endless belt. Among other fields, this belt mechanism has been employed in an image forming apparatus, such as copier, facsimile, and printer.

Japanese Laid-Open Publication No.63-313182 discloses an image forming apparatus including a belt fixing device for fusing an unfused toner image and then fixing it to a recording sheet. The belt-type fixing device has a drive roller, a driven roller, and an endless fixing belt made from thin walled film and entrained around the rollers, a heater disposed inside the fixing belt, and a pressure roller arranged outside the belt to nip a portion of the belt with the heater.

This belt type fixing device, however, has a drawback that the belt inevitably moves, or steers, in its transverse direction due to errors in circularities, surface configurations, and degree of parallelization of the rollers and a non-uniformity of thickness of the belt. This possibly causes the fixing belt to be damaged unless the transverse movement has been corrected. To overcome this problem, there have been proposed a device for detecting the transverse movement of the belt using a charge coupled device (CCD) or other optical sensor consisting of a pair of a light emitter and a light receiver and a device for correcting the transverse movement.

The optical detecting device occupies a relatively large space and is easy to be adversely affected by environmental variations. Also, a detecting component, e.g., lens, of the optical sensor can be soiled by dust generated both from products to be transported by the belt and from the belt itself, which possibly results in a false detection of the transverse movement of the belt. Further, the above mentioned belt fixing device having the heater requires the optical sensor to be arranged apart from the heater, limiting an arrangement of the optical detecting device. A thermal affection of the heater can be reduced to a certain extent by spacing the sensor from the heater, however, it is impossible to remove the thermal affection completely and therefore there still remains possibilities that reduce a duration of the sensor and result in the false detection of the transverse movement.

SUMMARY OF THE INVENTION

Among the several objects of this invention may be noted the provision of an improved apparatus for detecting a transverse movement of an endless belt rotatably entrained around a plurality of rollers which requires a reduced space for mounting; the provision of such an apparatus including a sensing member which has a durability against heat; the provision of such an apparatus capable of detecting the transverse movement of the belt and then correcting the same; and the provision of a fixing device including such apparatus.

Generally, apparatus of the present invention for detecting a transverse movement of an endless belt rotatably supported around a plurality of rollers includes a first conductive means and a second conductive means. The second conductive means forms a contact-type switch, or mechanical switch, with the first conductive member. An output from the switch is changed when the belt has moved transversely from a predetermined first region to a predetermined second region.

According to this arrangement, if the belt moves from the first region to the second region, the output from the switch is changed from on-state to off-state or vice versa. Therefore, by detecting the change of output signal from the switch, it can be determined whether the belt is in the first region or the second region.

In another aspect of the invention, the first conductive means is secured on the belt while the second conductive means is arranged in the second region. Also, the first conductive means is apart from the second conductive means when the belt is in the first region and the first conductive means brings in into contact with the second means when the belt moves transversely from the first region to the second region.

According to this invention, the first conductive means is secured on the belt while the second conductive means is arranged in the second region. Therefore, when the belt is in the first region, the switch is turned off, and when the belt is moved from the first region to the second region, the switch is turned on. As a result, by detecting that the output from the switch is changed from off-state to on-state, it can be determined that the belt has moved from the first region to the second region.

The second conductive means may be constituted by a pair of conductive members electrically insulated each other so that, when the belt moves transversely from the first region to the second region, the pair of conducting members are electrically connected each other through the first conductive means.

Also, the first conductive means may be arranged continuously along one circumferential edge of the belt.

Further, the first conductive means may be comprises a plurality of conductive portions arranged intermittently along one circumferential edge of the belt.

Furthermore, the first and second conductive means may be arranged to contact with each other in the second region so that, when the belt moves transversely from the first region to the second region, the belt separates the first and second means.

Moreover, either or both of the first and second conductive means may be made from a flexible conductive member.

Further, the contact-type switch may be arranged adjacent each circumferential edge of the belt.

In another aspect of the invention, an apparatus for detecting a transverse movement of an endless belt rotatably supported around a plurality of rollers comprises a first conductive means, and a second conductive means. The second conductive means forms a first contact-type switch with the first conductive member so that an output of the first switch is changed when the belt has moved transversely from a predetermined first region to a predetermined second region. The apparatus further comprises a third conductive means. This third conductive means forms a second contact-type switch with the first conductive means so that an output of the second switch is changed when the belt has moved transversely from the first region to a predetermined third region.

According to this invention, when the belt has moved from the first region to the second region, the output signal from the first switch is changed. Similarly, when the belt has moved from the first region to the third region, the output signal from the second switch is changed. Therefore, by arranging the second and third region on opposite sides of the first region, the transverse movement of the belt in opposite directions can be determined.

In another aspect of the invention, an apparatus for correcting a transverse movement of an endless belt rotatably supported around a plurality of rollers comprises a first conductive means and a second conductive means. The second conductive means forms a first contact-type switch with the first conductive member so that an output of the switch is changed when the belt has moved transversely from a predetermined first region to a predetermined second region. The apparatus further includes a slanting means responsive to the output of the switch for changing an angle of at least one of the rollers relative to the belt.

According to this invention, if it is determined that the belt has moved from the first region to the second region, an angle of at least one of the rollers relative to the belt is changed. As a result, the belt is moved back from the second region to the first region to correct the transverse movement of the belt.

In another aspect of the invention, an apparatus for correcting a steering of an endless belt rotatably supported around a plurality of rollers comprises a first conductive means and a second conductive means. The second conductive means forms a first contact-type switch with the first conductive member. An output of the first switch is changed when the belt has moved transversely in a first direction from a predetermined first region to a predetermined second region which is located on one side of the first region. The apparatus also comprises a third conductive means which forms a second contact-type switch with the first conductive means. An output of the second switch is changed when the belt has moved transversely in a second direction opposite to the first direction from the first region to a predetermined third region which is located on the other side of the first region. The apparatus further includes a first slanting means, responsive to the output from the first switch, for slanting at least one of the rollers relative to the belt in one direction to move the belt transversely from the second region to the first region, and a second slanting means, responsive to the output from the second switch, for slanting at least one of the rollers relative to the belt in the other direction opposite to the one direction to move the belt transversely from the third region to the first region.

According to this invention, the first switch detects that the belt has moved transversely in a first direction from the first region to the second region. Also, the second switch detects that the belt has moved transversely in the second direction opposite to the first direction from the first region to the third region. When the output signal from the first switch has changed, the first slanting means is operated for moving back the belt from the second region to the first region. On the other hand, when the output signal from the second switch has changed, the second slanting means is operated for moving back the belt from the third region to the first region.

In another aspect of the invention, an apparatus for fixing a toner image to a recording member comprises a n endless belt rotatably supported around a plurality of rollers, means arranged in contact with an inner peripheral surface of the belt for heating the endless belt, a first conductive means, and a second conductive means, the second conductive means forming a first contact-type switch with the first conductive member, an output of the first switch being changed when the belt has moved transversely from a predetermined first region to a predetermined second region.

In another aspect of the invention, the apparatus for fixing a toner image to a recording member comprises a third conductive means which forms a second contact-type switch with the first conductive means, an output of the second switch being changed when the belt moves transversely from the first region to a predetermined third region.

The heating means may comprise a frame made of heat resistant material and a heater adjacent the inner surface of the belt.

In another aspect of the invention, an apparatus for fixing a toner image to a recording member comprises a n endless belt rotatably supported around a plurality of rollers, a heating means arranged in contact with an inner peripheral surface of the belt for heating the endless belt, a first conductive means, and a second conductive means. The second conductive means forms a first contact-type switch with the first conductive member, and an output of the first switch is changed when the belt has moved transversely from a pre determined first region to a predetermined second region. The apparatus further includes a slanting means responsive to the output signal for changing an angle of at least one of the plurality of rollers relative to the belt.

In another aspect of the invention, an apparatus for fixing a toner image to a recording member comprises a n endless belt rotatably supported around a plurality of rollers, a heating means arranged in contact with an inner peripheral surface of the belt for heating the endless belt, a first conductive means, a second conductive means, and a third conductive means. The second conductive means forms a first contact-type switch with the first conductive member, and an output signal of the first switch is changed when the belt has moved transversely from a predetermined first region to a predetermined second region. Likewise, a third conductive means forms a second contact-type switch with the first conductive means, and an output signal of the second switch is changed when the belt has moved transversely from the first region to a predetermined third region. The apparatus further includes a fist slanting means responsive to the output signal of the first switch for changing an angle of at least one roller of the plurality of rollers relative to the belt to move the belt transversely from the second region to the first region, and a second slanting means responsive to the output signal of the first switch for changing an angle of at least one roller of the plurality of rollers relative to the belt to move the belt transversely from the third region to the first region.

The slanting means may include an eccentric cum for slanting the roller.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

PREFERRED EMBODIMENT OF THE INVENTION (a) FIRST EMBODIMENT

Figure 1:
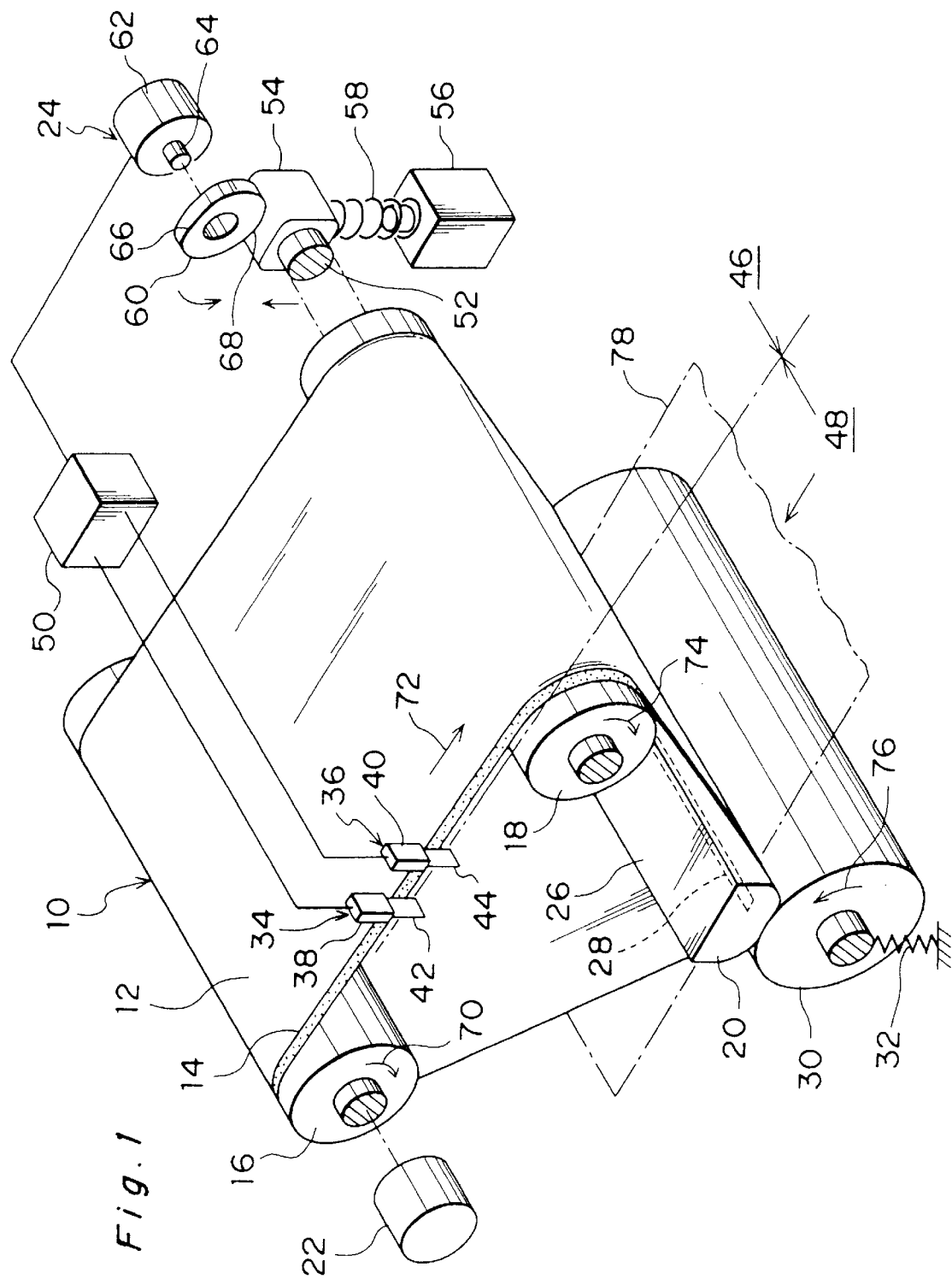
FIG. 1 is a perspective view of a first embodiment of a fixing device.
Figure 2:
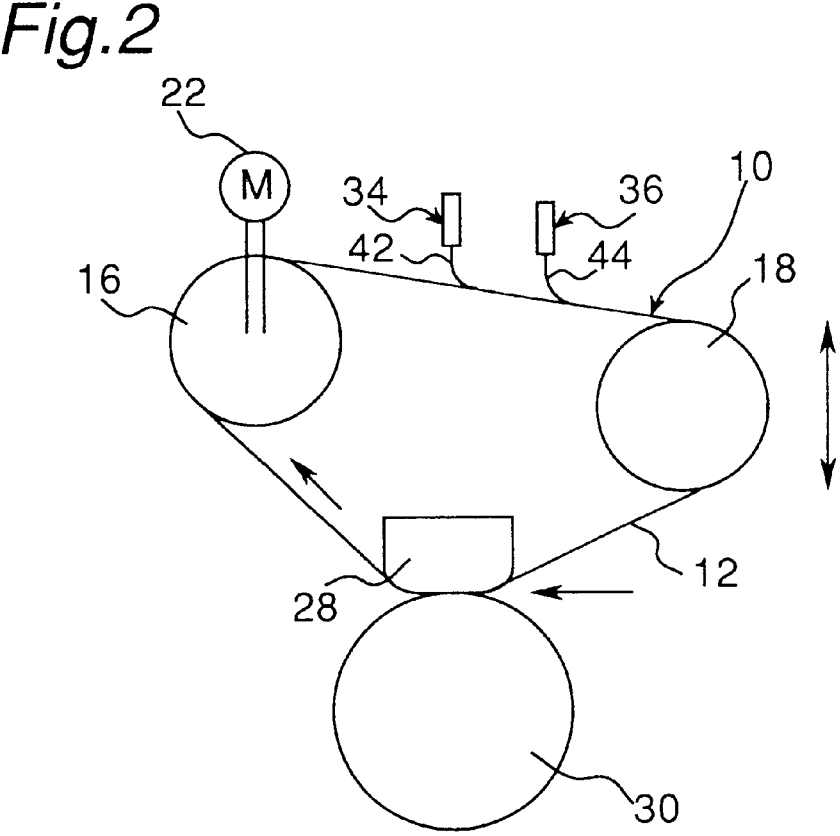
FIG. 2 is a side elevational view of the fixing device of the first embodiment.

Referring now to FIGS. 1 to 4, and more particularly to FIGS. 1 and 2, a belt-type fixing device 10, for use in an image forming machine such as copier and printer, for fusing an unfixed toner image transferred onto a recording sheet such as paper and then fixing it to the sheet. The fixing device 10 includes an endless fixing belt 12. Th is belt 12 has a substrate made from a heat-resistant film of an electrically non-conductive material. The film is preferably made from a polyimide film having a thickness of about 30 $\mu$m. The belt 12 has on its outer surface an electrically conductive strip-like portion 14 which extends continuously along one circumferential edge of the belt 12. Preferably, the conductive portion 14 is formed by coating or plating a metal such as copper or nickel. More preferably, a remaining portion of the outer peripheral surface of the belt 12 may be covered with an offset preventing layer having a thickness of about 10 $\mu$m. This layer is preferably made by applying a releasing material such as fluorine resin.

The belt 12 is entrained around three supporting members arranged substantially parallel to each other, i.e., a drive roller 16, a correct roller 18 for correcting the transverse movement of the belt 12, and a heater 20. Another roller may be arranged inside or outside the belt 12 in circumferential contact therewith so that the belt 12 is stretched in a suitable tension in its circumferential direction. The drive roller 16 is supported for rotation and drivingly connected with a drive motor 22. The correct roller 18 is also mounted for rotation. In addition, the correct roller 18 is supported at one end by a correcting mechanism 24 so that the supported end of the correct roller 18 can be slightly moved from a raised position to a lowered position and vice versa for correcting the steering of the belt 12. The heater 20 includes a frame made of heat resistant material and a strip-like heat member 28 arranged adjacent the inner peripheral surface of the belt 12.

A pressure roller 30 is arranged outside the belt 12 to oppose the heater 20 so that it nips the belt 12 with the heater 20. The pressure roller 30 is preferably forced by a biasing device 32 such as spring against the heater 20. A pair of detecting members 34 and 36 are disposed adjacent the circumferential edge of the belt 12 having the conductive portion 14 for detecting the transverse movement of the belt 12. The detecting members 34 and 36 have supports 38 and 40 of electrically non-conductive material and electrodes 42 and 44 made from flexible material (e.g., electrically conductive film), extended downward from the support 38 and 40, respectively. These electrodes 42 and 44 cooperate with the conductive portion 14 to constitute a contact-type switch, or mechanical switch. Specifically, when the belt 12 is within a normal running region, i.e., first region 46, each of the electrodes 42 and 44 is spaced from the conductive portion 14 so that the mechanical switch is turned off, whereas when the belt 12 moves transversely out of the first region 46 and enters a second region 48 adjacent thereto where the electrodes 42 and 44 exist, each of the electrodes 42 and 44 is brought into electrical contact with the conductive portion 14 thereby turning on the mechanical switch. The electrodes 42 and 44 are electrically connected with a control unit 50 for detecting whether the electrodes 42 and 44 are electrically connected to each other through the conductive portion 14.

The correcting mechanism 24 for correcting the transverse movement of the belt 12 has a bearing member 54 for rotatably supporting a shaft 52 of the correct roller 18. The bearing member 54 is biased upward by a spring 58 mounted on a support 56 secured to a body of the machine. An eccentric cam 60 is arranged above the correct roller 18 and the bearing member 54 is forced against an outer periphery of the cam 60. The eccentric cam 60 is secured to a drive shaft 64 of a motor 62 controlled by the control unit 50. Thus, upon rotation of the motor 62, the eccentric cam 60 rotates to selectively bring a first peripheral surface portion thereof, i.e., minimum radius portion 66, having a minimum radius from the center of the drive shaft 64 or a second peripheral surface portion thereof, i.e., maximum radius portion 68, having a maximum radius from the center contact with the bearing member 54, thereby raising and lowering one end of the correct roller 18.

Figure 3:
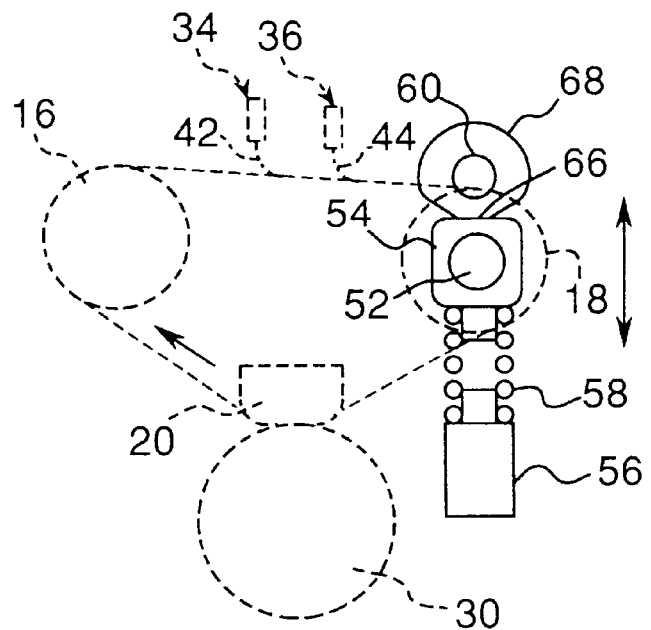
FIG. 3 is a side elevational view of a correcting mechanism of a belt in the fixing device of the first embodiment for describing a movement of the correct mechanism.
Figure 4A:
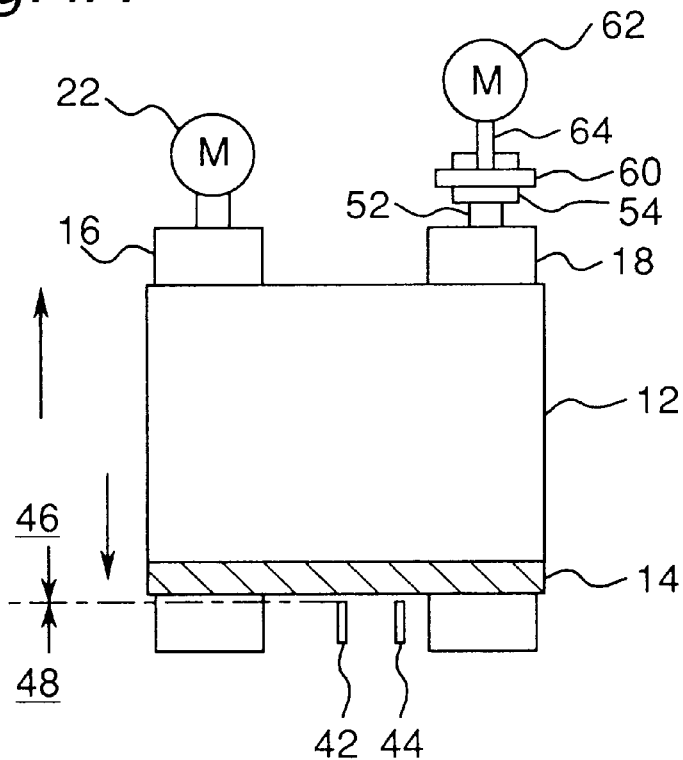
FIG. 4A is a plan view of the first embodiment in which the belt is in a first region.
Figure 4B:
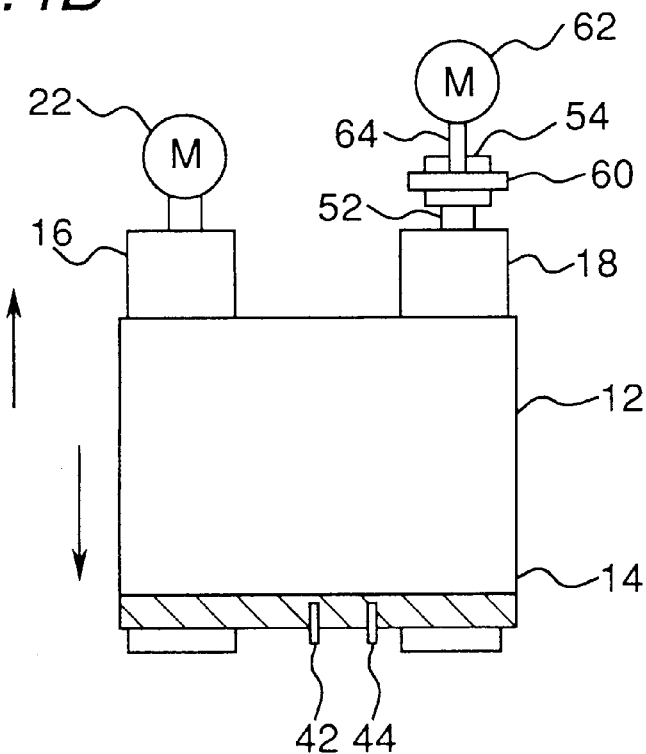
FIG. 4B is also a plan view of the first embodiment in which the belt is steered from the first region into a second region.

Specifically, FIG. 3 shows a normal state of the correcting mechanism 24 where the minimum radius portion 66 contacts with the bearing 54, thereby one end of the correct roller 18 is in the raised position. In this situation, by energizing the motor 22 of the fixing device 10 to move the belt 12 in the direction indicated by arrow 72 which is the normal rotational direction thereof at fixing, the belt 12 gradually moves transversely from the first region 46 towards the second region 48.

Contrary to this, FIG. 1 shows an operating state of the correcting mechanism 24 for correcting the transverse movement. In this situation, the maximum radius portion contacts with the bearing 54, thereby one end of the correct roller 18 is in the lowered position. The distance from the raised position and the lowered position corresponds to a difference of the maximum and minimum radii. With this operating state, once rotating the belt 12 in the direction of arrow 72, the belt 12 gradually moves transversely in the opposite direction, i.e., from the second region 48 towards the first region 46.

In operation of the fixing device 10 so constructed, upon rotation of the motor 22, the drive roller 16 rotates in the direction of arrow 70, which in turn rotates the belt 12 in the direction of arrow 72. This further rotates the correct roller 18 and pressure roller 30 in the directions of respective arrows 74 and 76. Then, the heat member of the heater 20 is energized by applying a certain voltage thereto, thereby heating the belt 12. A sheet 78 (shown in phantom in FIG. 1) having an unfused toner image (not shown) thereon is transported into a nipping region formed by the belt 12 and the adjacent pressure roller 30 where the toner is melted by the heat of the belt 12 and then fixed onto the sheet 78 based upon pressure applied by the pressure roller 30 against the belt 12.

During the fixing operation, the eccentric cam 60 is set that its minimum radius portion 66 contacts with the bearing member 54 (see FIG. 3). Although the belt 12 is expected to be in the first region 46, the correcting mechanism 24 is designed to cause the belt 12 to steer gradually from the first region 46 towards the second region 48 in this state. Thereby, the belt 12 steers gradually in the transverse direction as the time for its rotation increases. Once the belt 12 moves out of the first region 46 and then enters the second region 48, the electrodes 42 and 44 bring into electrically contact with the conductive portion 14 to turn on the switch constituted thereby (see FIG. 4B). At the same time that the switch is turned on, a predetermined time after it, or after de-energizing the motor 22, the control unit 50 drives the motor 62 to rotate the eccentric cam 60 a certain angle (for example, 180 degrees), causing the maximum radius portion 68 to bring into contact with the bearing member 54. This in turn causes one end of the correct roller 18 to descent from the raised position, i.e., normal position, to the lowered position by the distance which corresponds to the difference of maximum and minimum radii in the eccentric cam 60. Therefore, once the belt 12 is rotated in the altered state, it gradually moves in the opposite transverse direction from the second region 48 towards the first region 46 depending upon the rotational number thereof, thereby the unwanted steering of the belt 12 is corrected.

The belt 12 is preferably returned to a reference position in the first region 46 spaced a certain distance from a border that the first region 46 shares with the second region 48. This distance may be controlled based upon the time for rotation of the motor 22. Specifically, once the control unit 50 has energized the drive motor 62 to set the eccentric cam 60 into the state as shown in FIG. 1, it starts a timer for counting the time for rotation of the motor 22. If the counted time is increased to a predetermined time which requires the belt 12 to be returned to the reference position, the control unit 50 de-energizes the motor 22 and then energizes the motor 62 to rotate the eccentric cam 60 to the normal position shown in FIG. 3.

Instead of the time for rotation of the motor 22, the recovering movement of the belt 12 towards the reference position may be controlled by the rotational time of the motor 22, or the rotational time or number of other members such as belt 12, and rollers 18 and 30.

Although the conductive portion 14 is provided only along the circumferential edge of the belt 12, the entire outer peripheral surface of belt 12 may be conductive by mixing a conductive material into the releasing material which forms the outermost offset-preventing layer or by forming the belt with a conductive metal.

Other embodiments will be discussed hereinafter. In these embodiments, structures and their operations are substantially identical to those of the first embodiment unless any reference is made thereto.

(b) SECOND EMBODIMENT

Figure 5:
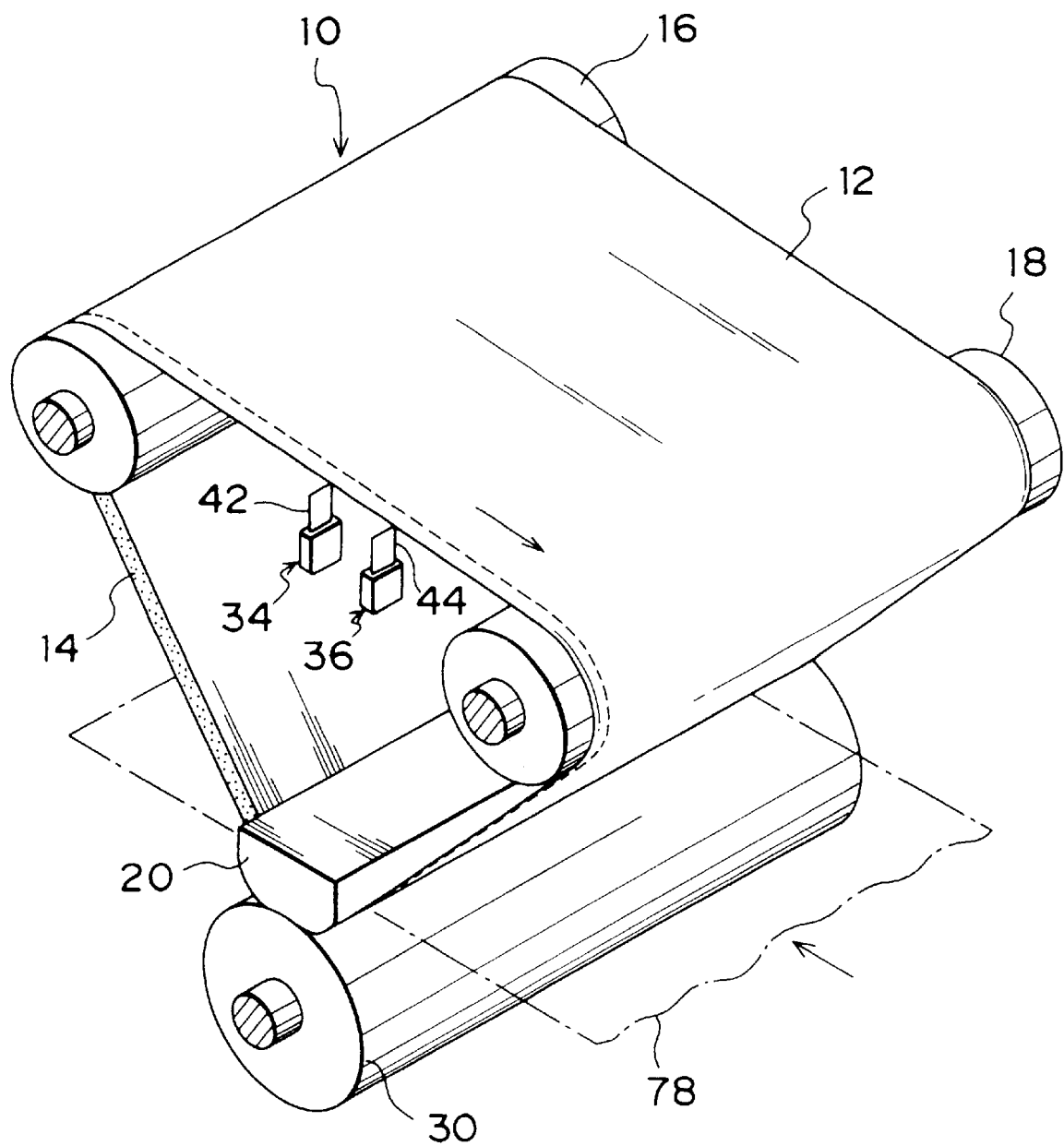
FIG. 5 is a perspective view of a second embodiment in which members for detecting the steering of the belt are arranged inside the belt.

FIG. 5 shows a second embodiment of the invention in which the detecting member 34 and 36 are arranged in a space defined by the belt 12 so that they can contact with the inner periphery of the belt 12. The belt 12 has the conductive portion 14 along the inner peripheral edge thereof.

This arrangement makes the fixing device smaller in size than that of the first embodiment.

Further, typically, the space surrounded by the belt is mostly occupied by other devices so that only a small room can be available. Besides, the devices in the space are heated by the heater, which prohibits the optical sensor from being arranged therein. This invention, however, employs small electrodes having a significant durability against the heat, which permits the fixing device to employ the arrangement of this embodiment, i.e., which allows the switch to be arranged inside the belt.

(c) THIRD EMBODIMENT

Figure 6:
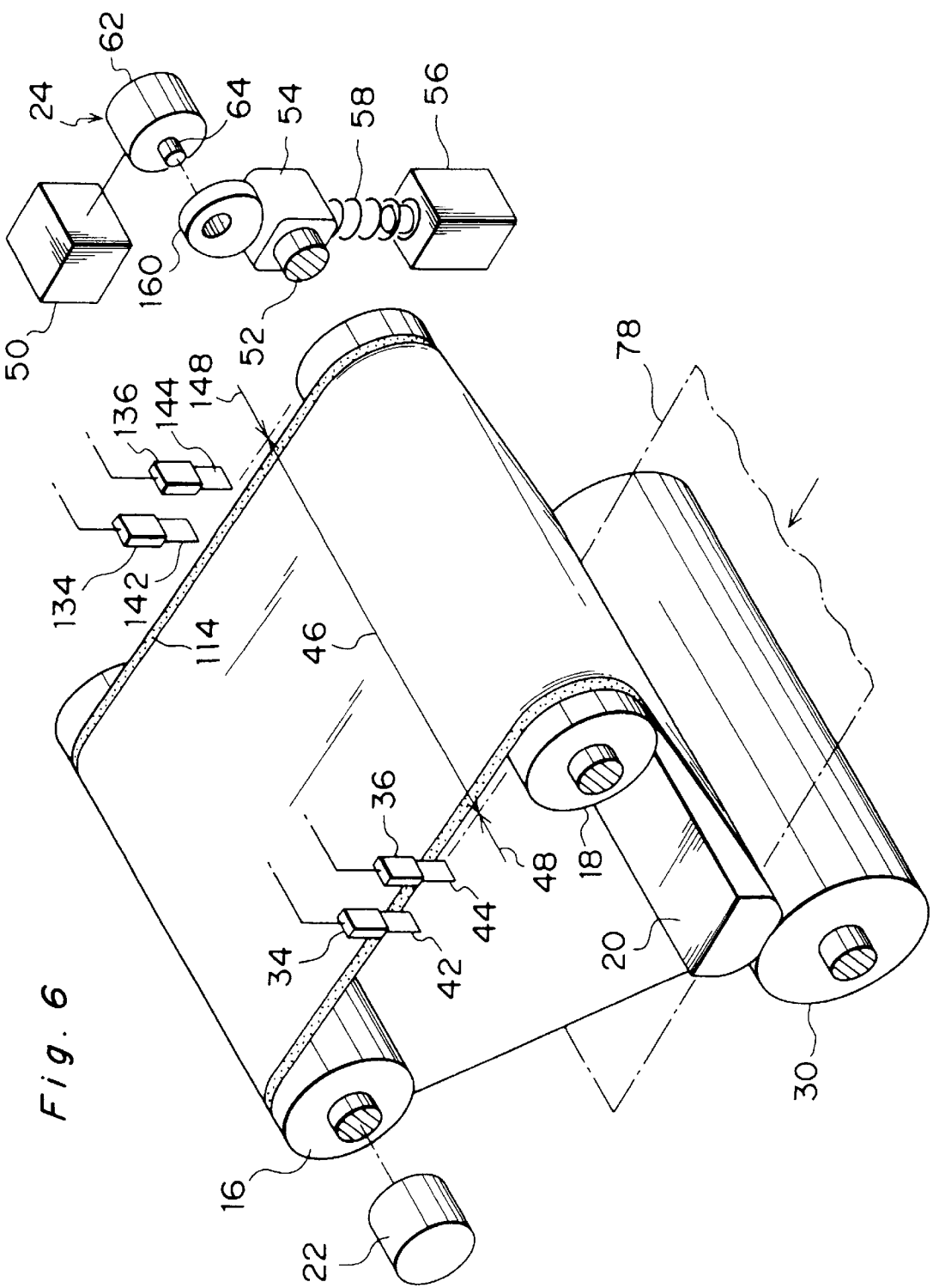
FIG. 6 is a perspective view of a third embodiment in which detecting members are arranged inside and outside the belt, respectively.

FIG. 6 shows a third embodiment of the invention in which another pair of detecting members 134 and 136 are arranged adjacent the opposite edge of the belt 12 to oppose the detecting members 34 and 36. The belt 12 has a continuous conductive portion 114 along the other outer peripheral edge opposite to that having a conductive portion 14. The detecting members 134 and 136 have electrodes 142 and 144, respectively. These electrodes 142 and 144 are adapted to cooperate with the conductive portion 114 for constituting a second contact-type switch, or mechanical switch.

In this arrangement, when the belt 12 is within the first region 46 between two pairs of detecting members, the switches, i.e., the conductive portion 14 and the electrodes 42 and 44, and the conductive portion 114 and electrodes 142 and 144, are turned off. If the belt 12 has moved transversely in one direction from the first region 46 to the second region 48, the conductive portion 14 contacts with and connects the electrodes 42 and 44. Then, by a correcting mechanism similar to that of the first embodiment, the belt 12 is returned from the second region 48 to the first region 46. Contrary to this, if the belt 12 has moved in the opposite direction from the first region 46 to the third region 148, the conductive portion 114 contacts with and connects the electrodes 142 and 144, and the belt 12 is returned from the third region 148 to the first region 46 by a correcting mechanism. This correcting mechanism is similar to that described in the first embodiment except that the eccentric cum 60 is replaced by another eccentric cam 160 described below.

As described, the correcting mechanism used in this embodiment is required to have two functions; one function to move the belt 12 from the second region 48 to the first region 46, and the other function to move the belt 12 from the third region to the first region 46.

Figure 7:
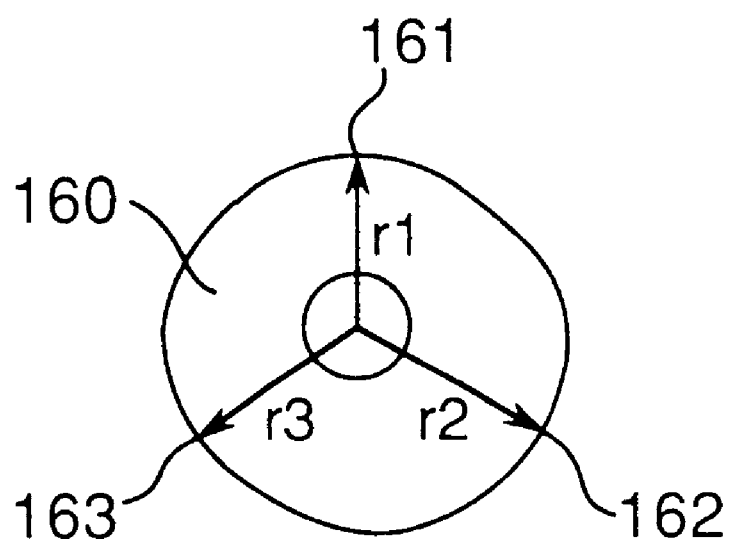
FIG. 7 is an enlarged plan front view of an eccentric cum used in a mechanism for correcting the transverse movement of the belt.

To this end, the correcting mechanism of this embodiment has an eccentric cum 160 shown in FIG. 7. The eccentric cam 160 includes a first peripheral surface portion (minimum radius portion) 161 having a radius of r(1), a second peripheral surface portion (maximum radius portion) 162 having a radius of r(2) which is greater than r(1), and a third peripheral surface portion (intermediate radius portion) 163 having an intermediate radius of r(3) which is greater than r(1) but less than r(2), i.e., r(1)<r(3)<r(2). These three surface portions 161, 162, and 163 are preferably arranged at equal circumferencial interval, i.e., 120°.

With this arrangement, normally, the intermediate radius portion 163 is kept in contact with the bearing member 54 rotatably supporting the correct roller 18. When the belt 12 has moved into the second region 48, the eccentric cam 160 rotates one-third revolution so that the maximum radius portion 162 having greater radius than that of the intermediate radius portion 163 is brought into contact with the bearing 54. This allows the belt 12 to move from the second region 48 to the first region 46 while the belt 12 is rotating.

If on the other hand the belt 12 has moved into the third region 148, the eccentric cam 160 rotates one-third revolution in the opposite direction so that the minimum radius portion 161 having less radius than that of the intermediate portion 163 is brought into contact with the bearing 54, thereby returning the belt 12 from the third region 148 to the first region 46 according to the rotation of the belt 12.

Thus, according to the third embodiment, the belt 12 that has moved in either direction can be recovered to the normal position. Although the first embodiment employs the mechanism that forces the belt 12 to gradually move towards the electrodes 42 and 44 so as to prevent the belt 12 from moving in the opposite direction, this kind of structure is not required to the correcting mechanism of this embodiment.

(d) FOURTH EMBODIMENT

Figure 8:
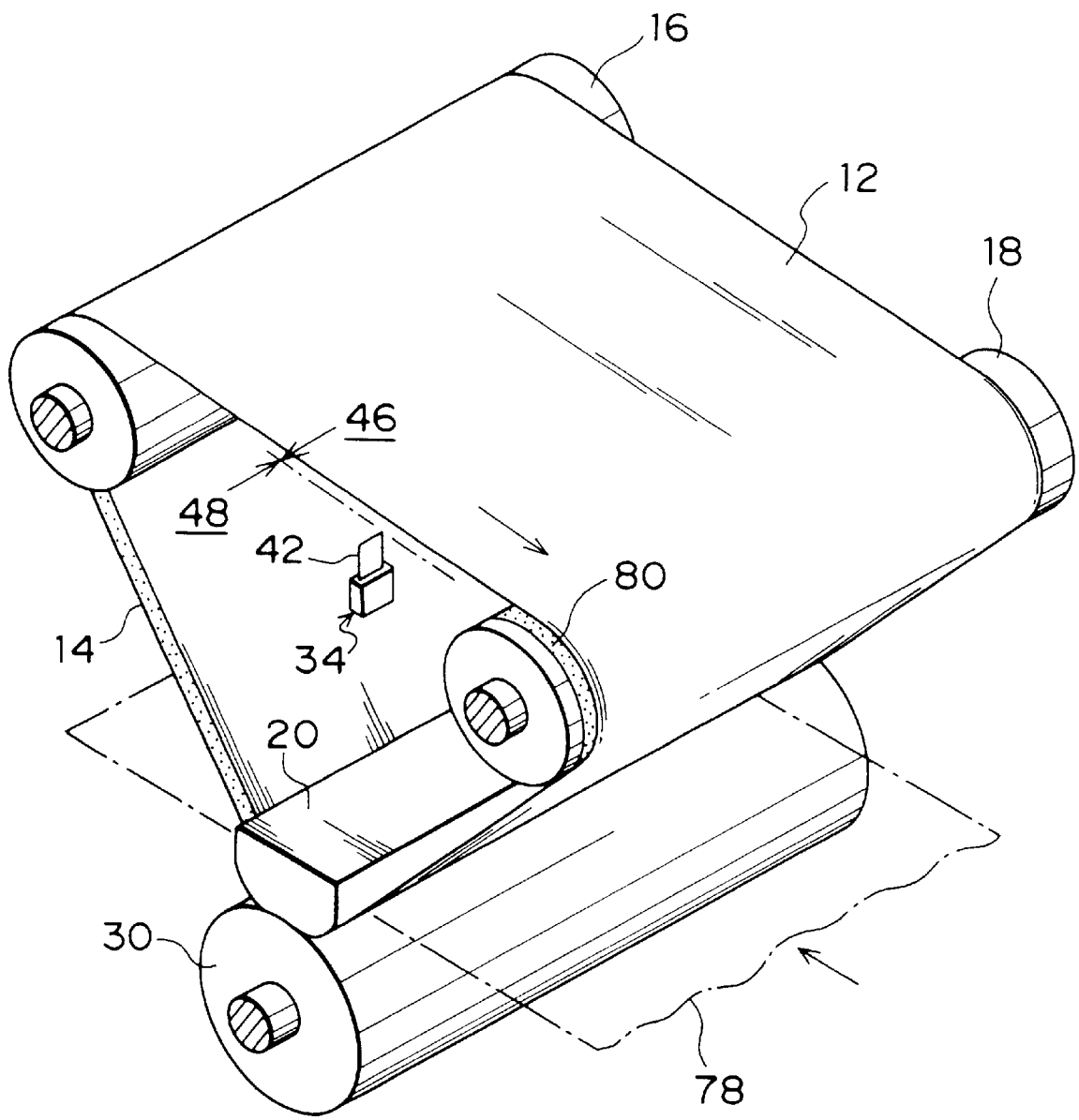
FIG. 8 is a perspective view of a fixing device of the fourth embodiment in which the conductive members are arranged inside the belt.

FIG. 8 shows a fourth embodiment of the invention in which only one detecting member 34 is so arranged that the electrode 42 thereof can contact with the inner peripheral surface of the belt 12. The belt 12 has a conductive portion 14 along its inner peripheral edge. Also, the correct roller 18 has an associated electrode 80 at its outer periphery adjacent the conductive portion 14 so that the electrode 80 can always contact with the conductive portion 14 of the belt 12 even though the belt 12 moves transversely in either direction. Further, the electrodes 42 and 80 are electrically connected with the control unit 50 (not shown in FIG. 8).

Accordingly, the electrode 42 and 80 and conductive portion 14 cooperate together to form a contact type switch. When the belt 12 is in the first region 46, the electrode 42 is out of contact with the electrode 80 and the switch is turned off. Once the belt 12 moves from the first region 46 into the second region 48, the electrode 42 comes into contact with conductive portion 14 and thereby is connected with the electrode 80 through the conductive port ion 14, i.e., the switch is turned on. The control unit 50, depending upon a signal received through the switch, controls the correcting mechanism to correct the transverse movement, i.e., steering, of the belt 12. In this embodiment, only one detecting member is provided within the belt, which allows the space within the belt to be used efficiently and the fixing device to be readily assembled.

It is to be understood that the conductive portion may be provided on the entire inner peripheral surface of the belt 12 or the belt itself may be made of a conductive material. Also, the position of the electrode 80 of the correct roller 18 is not restricted to that shown in FIG. 8 so far as it can always contact with the conductive portion 14. In addition, the correct roller 18 may be formed at its outer periphery with a conductive metal or an elastic material such as rubber in which a conductive material is dispersed therein. Further, the correct roller and its shaft may be made of respective conductive materials and, i n this case, the shaft may be electrically connected with the control unit.

(e) FIFTH EMBODIMENT

Figure 9:
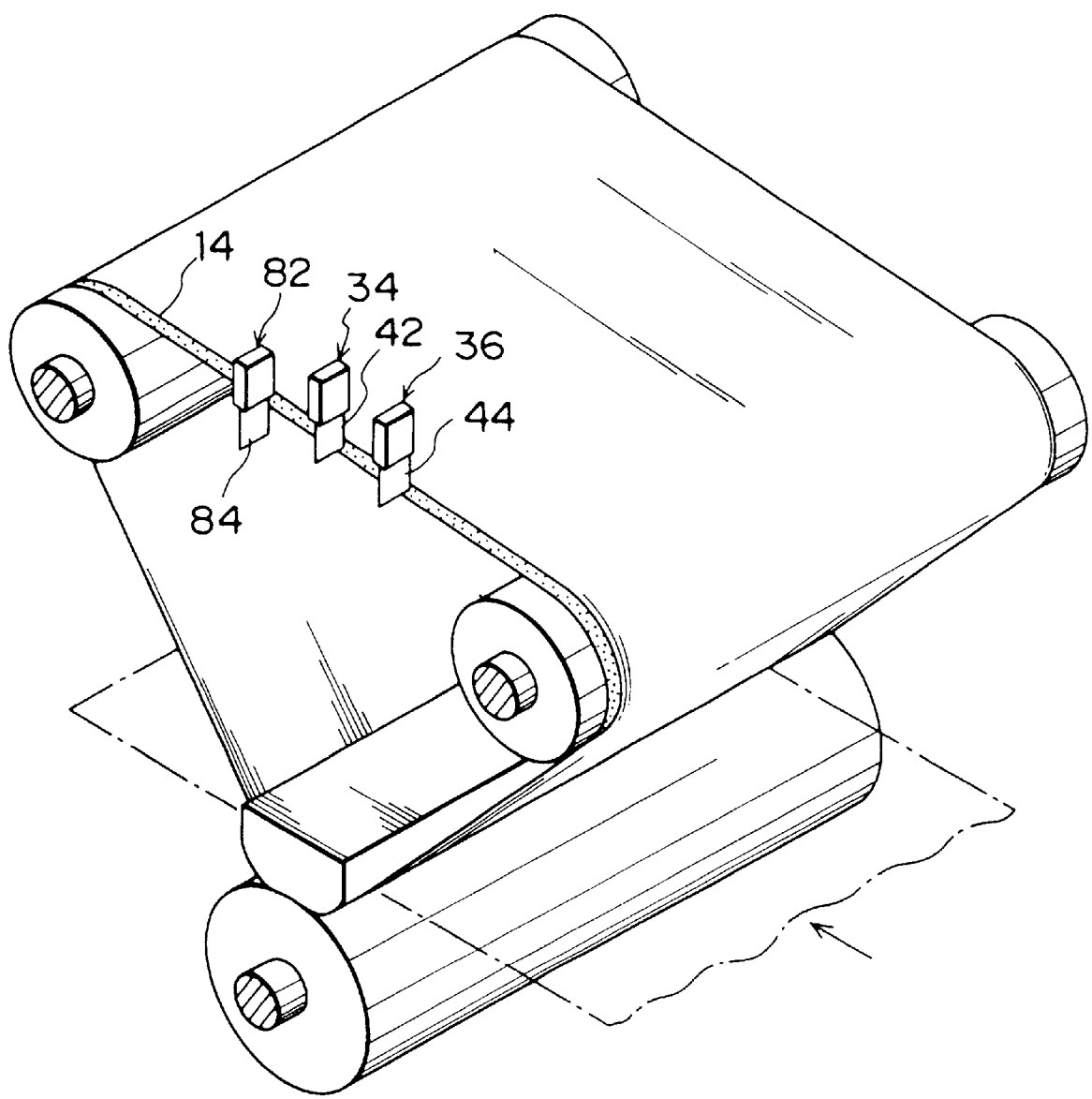
FIG. 9 is a perspective view of a fixing device of the fifth embodiment in which three detecting members are arranged adjacent one circumferential edge of the belt.

FIG. 9 shows a fifth embodiment of the invention in which the detecting members 34 and 36 are arranged on a line parallel to the rotational direction of the belt 12. A third detecting member 82 is disposed outside the line, remote from the belt 12.

This arrangement allows the belt 12 to be detected whether it is in a first position where the conductive portion 14 is out of contact with the electrodes 42, 44, and 84, a second position where the conductive portion 14 is in contact with the electrodes 42 and 44 while it is out of contact with electrode 84, or a third position where the conductive portion 14 is in contact with the three electrodes 42, 44, and 84.

Also, by the combination of the correcting mechanism shown in FIG. 6, the belt can be kept in the second position in the normal state. Further, when the belt has moved beyond the third position to a position where the conductive portion 14 is in contact with only the electrode 84, the control unit 50 may determine that the belt 12 is the abnormal position and then de-energize the fixing device.

Instead, the belt 12 may be kept in the first position in the normal state. In this situation, if the belt 12 has moved into the second position, it is returned to the first position. In addition, if the belt 12 has entered into the third position, the control unit may determine that the fixing device is abnormal.

It is to be understood that, although the detecting members 34 and 36 are arranged on the line parallel to the movement direction of the belt 12, the detecting members 34, 36, and 84 may be arranged with leaving respective spaces D1, D2, D3 (e.g., D1<D2<D3) from the edge of the belt.

(f) SIXTH EMBODIMENT

Figure 10A:
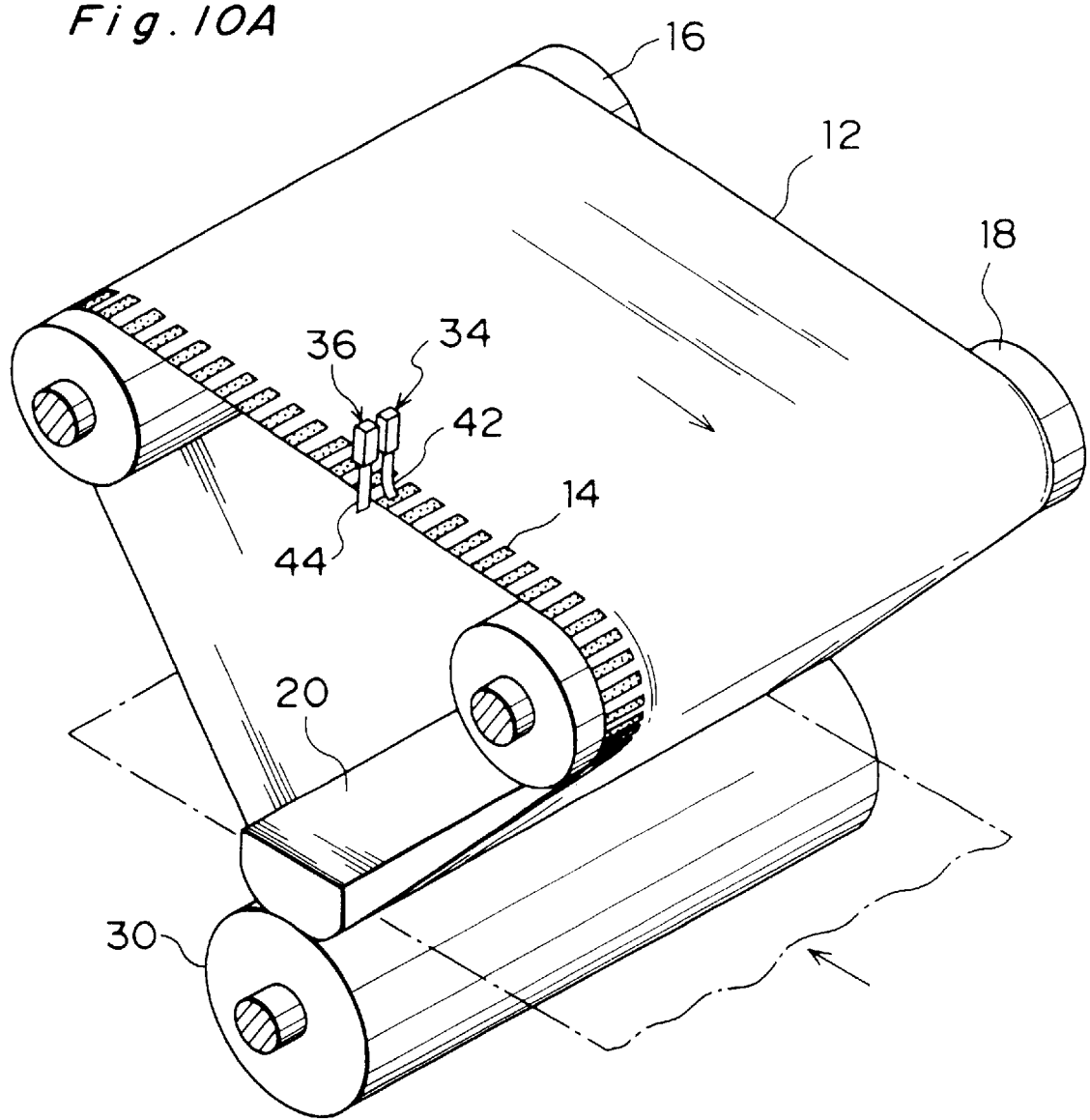
FIG. 10A is a perspective view of a fixing device of the sixth embodiment in which a number of conductive portions are intermittently arranged along one circumferential edge of the belt and a pair of detecting members are disposed on a line perpendicular to a moving direction of the belt.

FIG. 10A shows a sixth embodiment of the invention in which a number of conductive portions 14 are arranged intermittently along the circumferential edge of the belt 12. The detecting members 34 and 36 are spaced apart each other and arranged on a line which is parallel to the transverse direction of the belt 12.

With this arrangement, when both electrodes 42 and 44 of the detecting members 34 and 36 are in contact with the conductive portion 14, the control unit 50 receives a periodical signal having on-state and off-state alternately. Therefore, the control unit can determine the transverse movement of the belt by the change of signal.

Figure 10B:
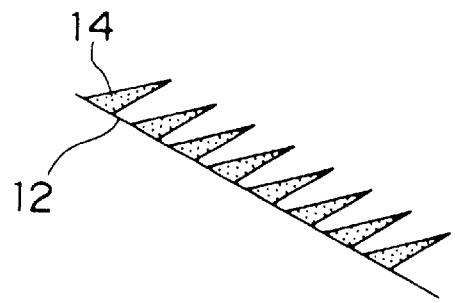
FIG. 10B is an enlarged partial perspective view of the belt in which each conductive portion is in the form of triangle.

Although each of the intermittently arranged conductive portions 14 shown in FIG. 10A is rectangular, it may be other configuration such as triangle shown in FIG. 10B in which the width thereof becomes narrower gradually from the edge of the belt 12 towards the opposing edge thereof. With this configuration, if the belt 12 moves transversely while both electrodes 42 and 44 intermittently contact with the conductive portions 14, the period of the on/off signal transmitted to the control unit is changed depending upon the position of the belt 12 relative to the electrodes 42 and 44. Therefore, by determining an on-duty-ratio (or off-duty-ratio) of the on/off signal, a precise position of the belt 12 relative to the electrodes 42 and 44 can be determined.

(g) SEVENTH EMBODIMENT

Figure 11:
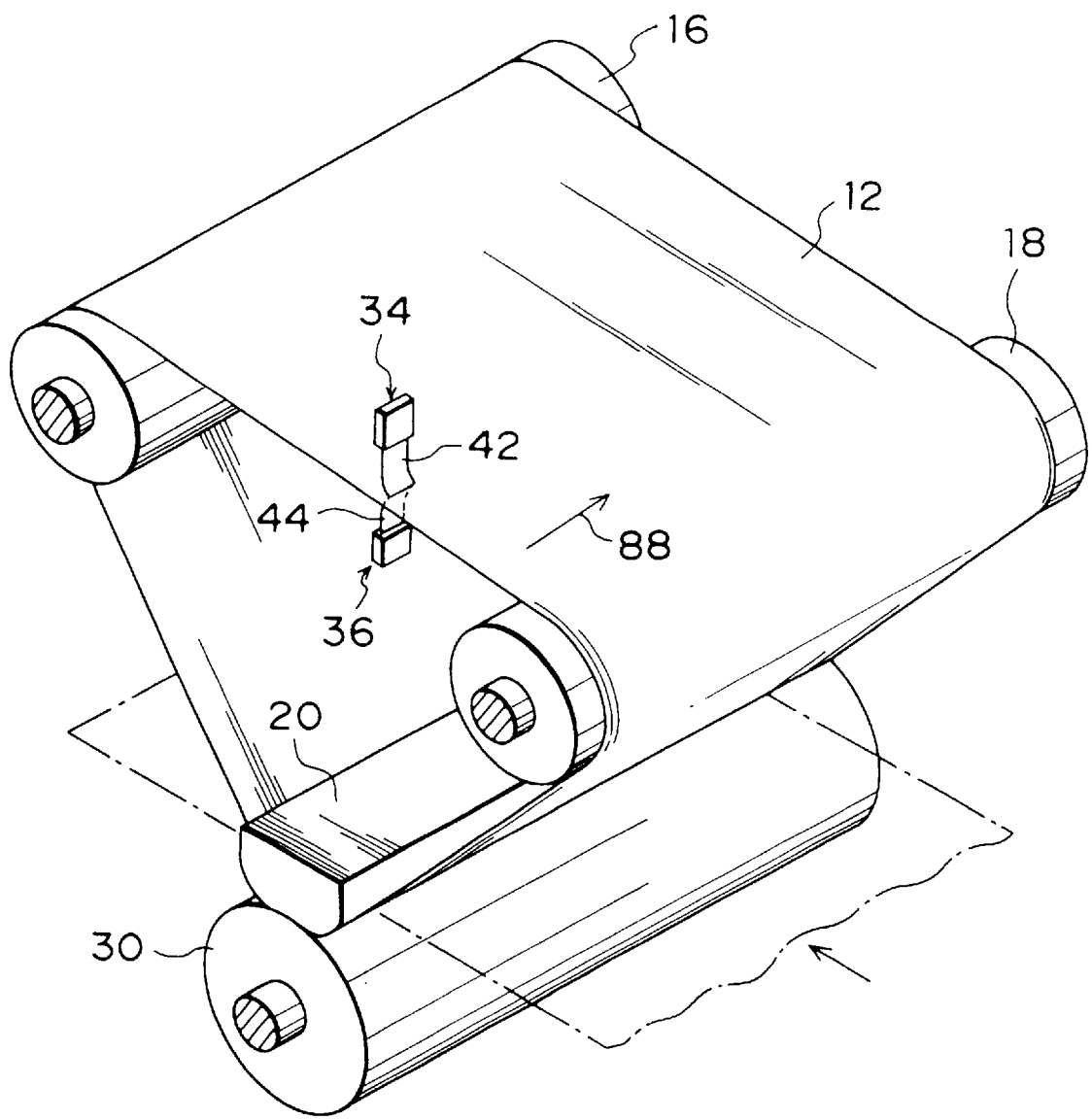
FIG. 11 is a perspective view of a fixing device of the seventh embodiment in which the detecting members are arranged inside and outside the belt, respectively, to oppose each other.
Figure 12:
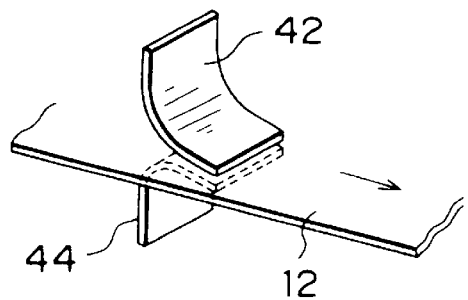
FIG. 12 is an enlarged partial perspective view of the belt and the detecting members in FIG. 11, in which the detecting members are separated by the belt.
Figure 13:
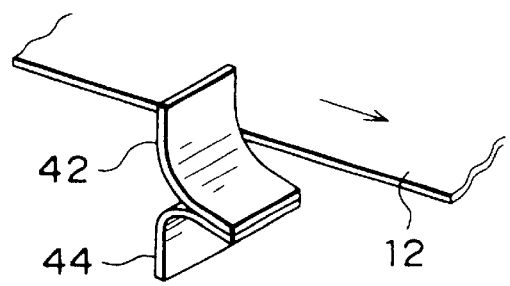
FIG. 13 is also an enlarged partial perspective view of the belt and the detecting members in FIG. 11, in which the detecting members are apart from the belt and contact each other.

FIG. 11 shows a seventh embodiment of the invention in which one detecting member 34 is arranged adjacent the outer periphery of the belt 12 while the other detecting member 36 is arranged adjacent the inner periphery of the belt 12 to oppose the detecting member 34. When the belt 12 is between the detecting members 34 and 36, the electrodes 42 and 44 of the detecting members 34 and 36 are separated each other (see FIG. 12), turning off the contact-type switch constituted by the electrodes 42 and 44. Also, if the belt 12 moves in the direction of arrow 88 and then away from the electrodes 42 and 44, the electrode 42 brings into contact with the electrode 44 to turn on the switch formed thereby (see FIG. 13). From this situation, when the belt 12 moves in the direction opposite to the arrow 88 and then enters between the electrodes 42 and 44, the electrode 42 is separated from the electrode 44 to turn off the switch. Then, the control unit detects the transverse movement of the belt depending upon the on/off signal received from the switch and, if necessary, corrects the steering of the belt by operating the correcting mechanism.

Figure 14:
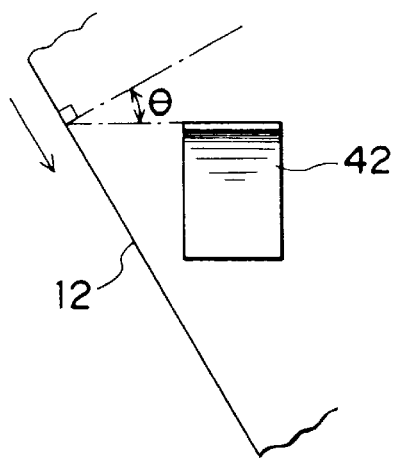
FIG. 14 is a plan view of the detecting members in the seventh embodiment, which shows an arrangement the detecting members.

In this embodiment, as shown in FIG. 14, the electrodes 42 and 44 are preferably slanted against the rotational or moving direction of the belt. Specifically, an angle θ defined by a vertical line (illustrated in phantom) extended from the circumferential edge of the belt and a setting direction (also illustrated in phantom) of the supporting member of the electrode preferably ranges from about 20° to 70° to prevent the belt and electrodes from being damaged. That is, to set the angle less than 20° can damage the side edge portion of the electrodes. Also, in case that the angle is more than 70°, when the electrodes are leaving the belt, the outer free end corner of each electrode being about to leave away from the circumferential edge of the belt can be folded onto the opposite surface of the belt 12, e.g., the upper electrode 42 can be folded under the belt 12, which possibly damages both the electrode and the belt.

Figure 15:
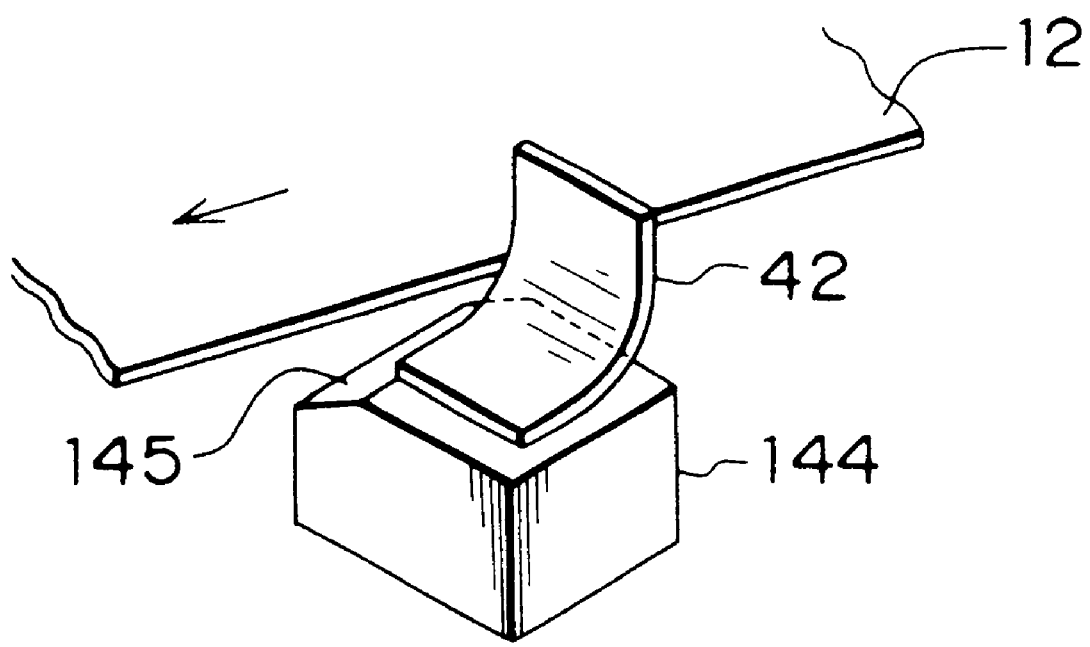
FIG. 15 is a perspective view of detecting members of another embodiment suitable for the seventh embodiment.

Although each electrode is made of film-like conductive member, it can be replaced by a conductive brush, or electrically conductive rigid member 144 shown in FIG. 15. As shown, this rigid member 144 preferably has a slanted or curved corner 145 adjacent the belt, which reduces the friction force between the belt and the member 144 and further their wearings.

Figure 16:
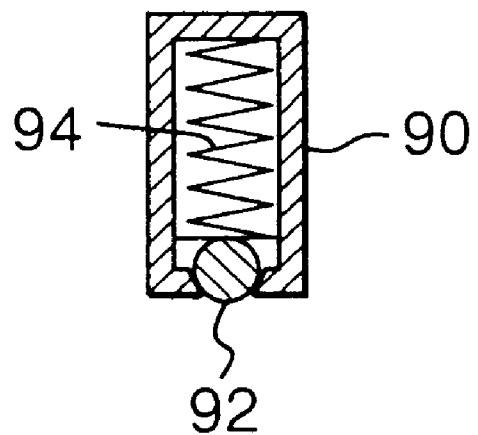
FIG. 16 is a sectional view of another embodiment of the detecting member.

Another detecting member shown in FIG. 16 may be employed. This detecting member includes a cylindrical housing 90, made of electrically non-conductive material, having an opening at its one end. A ball 92, made of electrically conductive material, is accommodated in the housing 90. This ball 92 is forced by an electrically conductive spring 94 towards the opening so that one portion thereof can be protruded from the opening. This detecting member is secured above and/or below the belt so that the ball can be in contact with the belt. Also, the spring 94 is electrically connected with the control unit.

Figure 17:
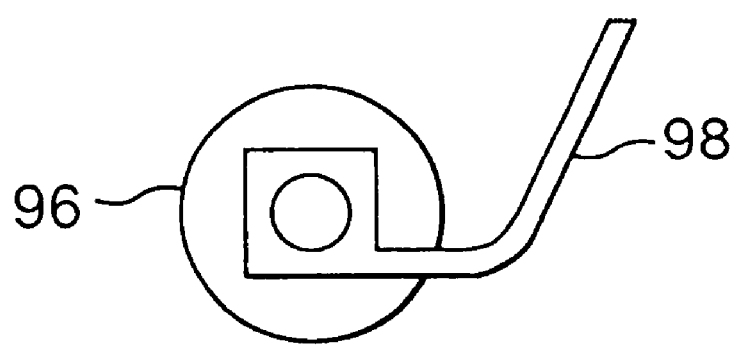
FIG. 17 is a sectional view of other embodiment of the detecting member.

Other detecting member shown in FIG. 17 may be employed. This detecting member has a lever 98 and a roller 96 rotatably supported by the lever 98, both made of electrically conductive material. This detecting member is also arranged above and/or below the belt and the lever 98 is electrically connected with the control unit.

Further, the correcting mechanism is not limited to that described above, and a variety of improvements can be provided thereto. Specifically, a solenoid may be used in place of motor and cum for moving one end of the correct roller up and down.

Also, the roller to be used as a correct roller is not limited to the embodiments. That is, if the fixing device has a tension roller in circumferential contact with the inner or outer surface of the belt, the transverse movement of the belt may be corrected by moving the tension roller.

Further, although, to correct the transverse movement of the belt, one end of the correct roller is moved up and down, it may be moved back and forth along the belt.

Furthermore, a method for correcting the transverse movement of the belt is not limited to the above described method in which one end of the roller is moved, and other known method can be used therefor.

Moreover, although the control unit detects the on/off-state of the mechanical switch and based upon the detected result the correcting mechanism is driven, a drive source such as motor in the correcting mechanism is directly connected through the mechanical switch with a power source and thereby causing the drive source to energize directly when the switch is changed from on-state to off-state and vice versa. This permits the control unit to be eliminated, which simplifies the structure of the fixing device.

Furthermore, although a variety of embodiments have been described above in each of which the belt is used in the belt-type fixing device, the present invention can equally be utilized in a belt conveyor system which transports products using a conveyor belt for purposes of detecting and correcting the transverse movement of the conveyor belt.

In addition, the invention can be used in an ink-film feeding mechanism of a thermal printer in which the ink-film wound about a feed roll is fed therefrom and then re-wound about a rewinding roll and an ink on the film is transferred to a recording sheet by applying heat to selected portions of the film, for the purpose of detecting and correcting the steering of the film.

As described above, according to the present invention, because the transverse movement of the belt is detected based upon the signal from the switch having a greater heat resistance, which allows the device including such switch to be minimized, to be inexpensive, and to be used for a long time. Also, a precise detection of the transverse movement of the belt can be established. Further, the device is hardly affected by the dust, which ensures the precise detection of transverse movement of the belt.

What is claimed is:

1. An apparatus for detecting a movement of an endless belt rotatably supported, comprising:

a first electrically conductive means secured on said belt; and a second electrically conductive means forming an electrical switch with said first electrically conductive means, an output of said switch being changed when the belt has moved from a predetermined first region to a predetermined second region.

2. An apparatus for detecting a transverse movement of an endless belt rotatable supported around a plurality of rollers, comprising:

a first conductive member; and a second conductive member, said second conductive member forming a contact-type switch with said first conductive member, an output of said switch being changed when the belt has moved transversely from a predetermined first region to a predetermined second region;

wherein said first conductive member is secured on said belt while said second conductive member is arranged in said second region, and said first conductive member is apart from said second conductive member when said belt is in said first region and said first conductive member is brought into contact with said second conductive member when said belt moves transversely from said first region to said second region.

3. An apparatus set forth in claim 2, wherein said second conductive member has a pair of conductive contacts electrically insulated from each other and, when said belt moves transversely from said first region to said second region, said pair of conducting contacts are electrically connected to each other through said first conductive member.

4. An apparatus set forth in claim 3, wherein said first conductive member is continuously arranged along one circumferential edge of said belt.

5. An apparatus set forth in claim 3, wherein said first conductive member comprises a plurality of conductive portions arranged intermittently along one circumferential edge of said belt.

6. An apparatus for detecting a transverse movement of an endless belt rotatably supported around a plurality of rollers, comprising:

a first conductive member; and a second conductive member, said second conductive member forming a contact-type switch with said first conductive member, an output of said switch being changed when the belt has moved transversely from a predetermined first region to a predetermined second region;

wherein said first and second conductive members are arranged to contact with each other when the belt is in said first region and, when said belt moves transversely from said first region to said second region, said belt separates an electric circuit between said first and second conductive members, said belt completing an electric circuit between said first and second conductive members.

7. An apparatus for detecting a transverse movement of an endless belt rotatably supported around a plurality of rollers, comprising:

a first conductive member; and a second conductive member, said second conductive member forming a contact-type switch with said first conductive member, when the belt has moved transversely from a predetermined first region to a predetermined second region, said belt completing or breaking an electric circuit between said first and second conductive members;

wherein either or both of said first and second conductive members are made from a flexible conductive member.

8. An apparatus for detecting a transverse movement of an endless belt rotatably supported around a plurality of rollers, comprising:

a first conductive member; and a second conductive member, said second conductive member forming a contact-type switch with said first conductive member, an output of said switch being changed when the belt has moved transversely from a predetermined first region to a predetermined second region, wherein said contact-type switches are formed adjacent both circumferential edges of said belt.

9. An apparatus for detecting a transverse movement of an endless belt rotatably supported around a plurality of rollers, comprising:

a first conductive member;

a second conductive member, said second conductive member forming a first contact-type switch with said first conductive member, an output of said first switch being changed when the belt has moved transversely from a predetermined first region to a predetermined second region; and a third conductive member, said third conductive member forming a second contact-type switch with said first conductive member, an output of said second switch being changed when the belt has moved transversely from said first region to a predetermined third region.

10. An apparatus for correcting a transverse movement of an endless belt rotatably supported around a plurality of rollers, comprising:

a first conductive member;

a second conductive member, said second conductive member forming a contact-type switch with said first conductive member, when the belt has moved transversely from a predetermined first region to a predetermined second region, said belt completing or breaking an electric circuit between said first and second conductive members; and a slanting means responsive to said output of said switch for changing an angle of at least one of said rollers relative to said belt.

11. An apparatus set forth in claim 10, wherein said slanting means includes an eccentric cam for slanting said roller.

12. An apparatus for correcting a transverse movement of an endless belt rotatably supported around a plurality of rollers, comprising:

a first conductive member;

a second conductive member, said second conductive member forming a first contact-type switch with said first conductive member, an output of said first switch being changed when the belt has moved transversely in a first direction from a predetermined first region to a predetermined second region which is located on one side of said first region; and a third conductive member, said third conductive member forming a second contact-type switch with said first conductive member, an output of said second switch being changed when the belt has moved transversely in a second direction opposite to said first direction from said first region to a predetermined third region which is located on the other side of said first region;

a first slanting means, responsive to said output of said first switch, for slanting at least one of said rollers relative to said belt in one direction to move said belt transversely from said second region to said first region; and a second slanting means, responsive to said output from said second switch, for slanting at least one of said rollers relative to said belt in the other direction opposite to said one direction to move said belt transversely from said third region to said first region.

13. An apparatus set forth in claim 12, wherein said slanting means includes an eccentric cam for slanting said roller.

* * * * *